United States Patent
Derr

(10) Patent No.: US 10,459,491 B2
(45) Date of Patent: Oct. 29, 2019

(54) HOUSING FOR AN ELECTRONIC DEVICE AND ASSEMBLY KIT FOR A HOUSING

(71) Applicant: Testo SE & Co. KGaA, Lenzkirch (DE)

(72) Inventor: Andreas Derr, Donaueschingen (DE)

(73) Assignee: Testo SE & Co. KGaA, Lenzkirch (DE)

( * ) Notice: Subject to any disclaimer, the term of this patent is extended or adjusted under 35 U.S.C. 154(b) by 0 days.

(21) Appl. No.: 15/781,918

(22) PCT Filed: Nov. 25, 2016

(86) PCT No.: PCT/EP2016/001991
§ 371 (c)(1),
(2) Date: Jun. 6, 2018

(87) PCT Pub. No.: WO2017/097402
PCT Pub. Date: Jun. 15, 2017

(65) Prior Publication Data
US 2018/0364762 A1 Dec. 20, 2018

(30) Foreign Application Priority Data
Dec. 7, 2015 (DE) .......................... 10 2015 015 707

(51) Int. Cl.
| | |
|---|---|
| G06F 1/00 | (2006.01) |
| G06F 1/16 | (2006.01) |
| A45C 11/00 | (2006.01) |
| A45C 13/00 | (2006.01) |
| H04B 1/3888 | (2015.01) |
| H04B 1/38 | (2015.01) |

(52) U.S. Cl.
CPC ............ *G06F 1/1656* (2013.01); *A45C 11/00* (2013.01); *A45C 13/008* (2013.01); *G06F 1/1626* (2013.01); *H04B 1/3888* (2013.01); *A45C 2011/002* (2013.01); *A45C 2011/003* (2013.01); *G06F 2200/1631* (2013.01); *G06F 2200/1633* (2013.01); *H04B 2001/3894* (2013.01)

(58) Field of Classification Search
CPC ................. G06F 1/1656; G06F 1/1626; G06F 2200/1631; G06F 2200/1633; A45C 11/00; A45C 13/008; A45C 2011/002; A45C 2011/003; H04B 1/3888; H04B 2001/3894
See application file for complete search history.

(56) References Cited

U.S. PATENT DOCUMENTS

| | | | |
|---|---|---|---|
| 5,436,088 A * | 7/1995 | Castaneda ........... | H01M 2/1055 429/123 |
| 2004/0027040 A1 | 2/2004 | Derr et al. | |
| 2006/0171044 A1* | 8/2006 | Carnevali ............ | G02B 25/005 359/802 |
| 2009/0009945 A1 | 1/2009 | Johnson et al. | |

(Continued)

FOREIGN PATENT DOCUMENTS

DE          10061893          6/2002

*Primary Examiner* — Khai M Nguyen
(74) *Attorney, Agent, or Firm* — Volpe and Koenig, P.C.

(57) ABSTRACT

A housing (1) for an electronic device (15) is provided with a circumferential seal (7) between a lower shell (3) and an upper shell (4), which is formed by at least two juxtaposed sealing segments (8, 9, 10, 11), and/or to configure the lower shell (3) and the upper shell (4) without undercuts and/or to hold them together with clip-on, transferable clamps (38).

14 Claims, 4 Drawing Sheets

(56) References Cited

U.S. PATENT DOCUMENTS

2013/0242477 A1\* 9/2013 Hattori ................. H04M 1/026
                                                    361/679.01
2014/0184042 A1   7/2014 Carnevali
2015/0098200 A1\* 4/2015 Spangberg ............ H05K 5/069
                                                    361/752

\* cited by examiner

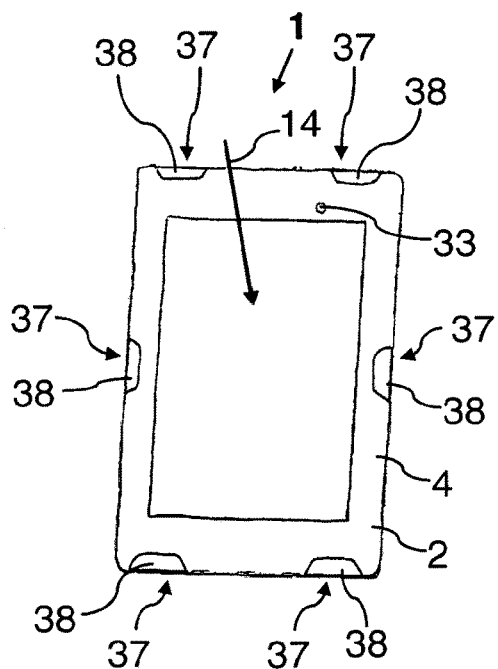
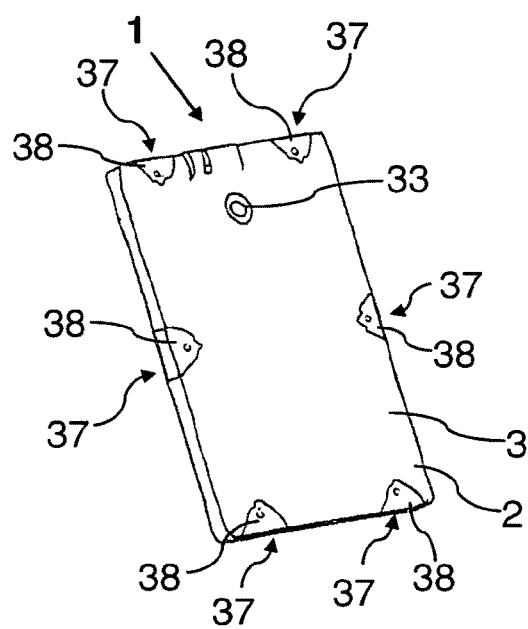
Fig. 2          Fig. 3
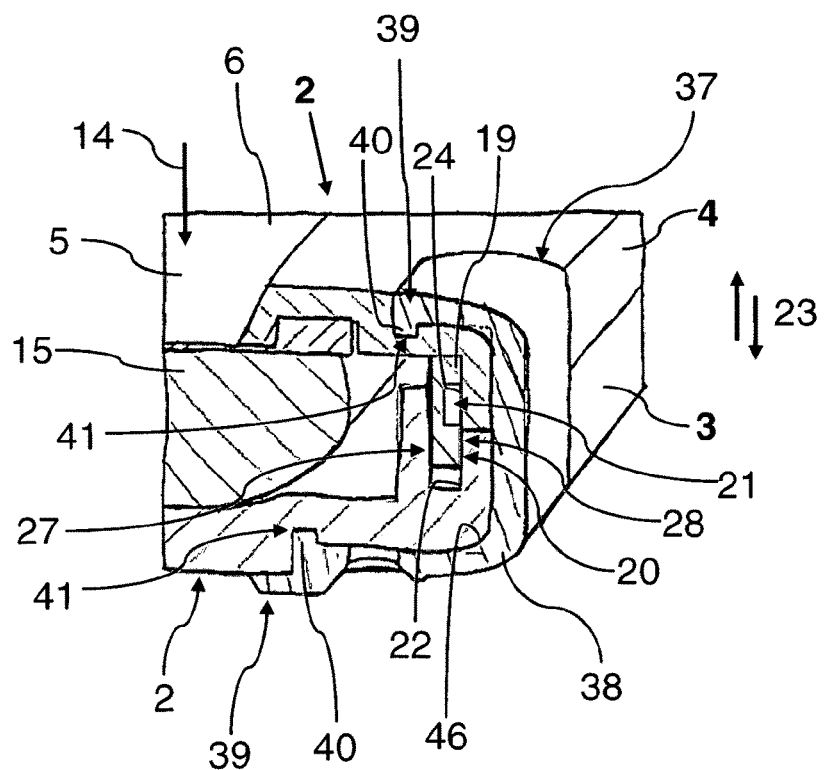
Fig. 4

HOUSING FOR AN ELECTRONIC DEVICE AND ASSEMBLY KIT FOR A HOUSING

BACKGROUND

The invention relates to a housing for an electronic device, having two housing shells, wherein a first housing shell is constructed as a lower shell and a second housing shell is constructed as an upper shell which can be positioned on the lower shell, wherein a viewing and/or activation window which is closed with a display protection film is constructed in the upper shell, and wherein a connection between the housing shells is sealed by a peripheral seal.

Such housings are known in order to receive, for example, tablets, Smartphones or similar electronic devices and to protect them against environmental influences, in particular against splashes of water.

In this case, it has become usual to produce an individually adapted housing for the different Smartphone and tablet shapes which are commercially available. Since the housings are produced from plastics material using injection-molding technology, it is necessary to produce a separate injection-molding tool therefor in each case.

SUMMARY

An object of the invention is to simplify the production complexity for such a housing.

In order to achieve this object, one or more features according to the invention are provided. In particular, consequently, in order to achieve the object mentioned, there is provision according to the invention in a housing of the type described in the introduction for the seal to be comprised of at least two sealing segments which are separate from each other and which are placed against each other in an extent direction of the peripheral seal. In this case, it is advantageous for it to be possible to change the height and width of such a housing in order to receive another type of Smartphone or tablet simply using the tools for producing the seal. This is because the separation lines or separation locations, at which the sealing segments are assembled, readily afford the possibility of adaptation to a different dimension of the housing without the injection-molding tools further having to be changed for the seal.

In this case, it is particularly advantageous for the peripheral seal to describe edges of a rectangle. In this manner, it may be possible for changes in the height or width of the housing to be readily able to be produced for adaptation to a new tablet type. In this case, the adaptation of a housing to a tablet type refers to the change of the associated production tools so that a newly produced housing fits a new type of electronic device and can receive it therein in a fitting manner.

In one embodiment of the invention, there may be provision for the construction in at least one sealing segment of a support mat for fixing an inserted electronic device in an activation direction predetermined by the viewing and/or activation window. In this case, it is advantageous for it to be possible to receive the electronic device in an impact-resistant manner in the housing and/or for an undesirable displacement of the electronic device in the housing to be able to be prevented.

It is particularly advantageous if support mats which correspond are constructed at least on two sealing segments. In this case, it is advantageous for the two sealing segments to be able to be produced with the same forming tool, wherein only slight modifications are necessary, with particular regard to the length, in order to produce the respective sealing segment.

In one embodiment of the invention, there may be provision for the at least two sealing segments each to have a portion having a constant cross-section at an end. In this case, it is advantageous for a change of length of the sealing segments to be able to be readily achieved in the event of adaptation of the housing to be produced to a new width and/or a new height by accordingly cutting to length in this portion. This can be carried out particularly simply with a forming tool which is present.

It can generally be said that the sealing segments can each form a portion of the peripheral seal, in particular consequently an annular portion. The preferred embodiment accordingly makes provision for four sealing segments which each define an edge of a rectangular ring.

It is particularly advantageous if a support mat, in particular the already-mentioned support, is constructed at an end of each sealing segment opposite the portion having the constant cross-section. In this case, it is advantageous for a linear extent of the sealing segment to be able to be produced so that a short mold removal path can be produced transversely relative to the extent direction of the sealing segment.

In an embodiment of the invention, there may be provision for the seal to have a peripheral sealing lip and a peripheral sealing face. In this case, it is advantageous for the housing shells to be able to be sealed separately. In this manner, it is possible to carry out simple assembly of the housing, wherein high protection classes can be achieved with respect to environmental influences, such as splashes of water, for example, IP65. In this case, it is particularly advantageous for the sealing lip and the sealing face to be separated from each other by a peripheral groove. In this manner, it is readily possible to carry out removal of a housing shell from the sealing lip during which the other housing shell remains on the sealing face so that the peripheral seal remains in a defined manner in one of the two housing shells. Alternatively or additionally, there may be provision in this case for the seal to seal transversely relative to an assembly direction of the housing shells. In this case, it is advantageous for it not to be necessary to act on the housing shells with pressure in the assembly direction in order to achieve the sealing. This makes simple assembly easier in order to achieve a high protection class. In this case or alternatively, there may be provision for the seal to abut an abutment face of at least one housing shell, preferably both housing shells, orientated transversely to an assembly direction, for example, the already-mentioned assembly direction. In this manner, it is possible for the seal not to be constructed in the direction of the assembly direction but instead transversely thereto so that the seal is produced transversely relative to the sealing direction as a result of the housing shells being fitted one over the other. It is particularly advantageous if the sealing lip and/or the sealing face seal(s) transversely relative to the assembly direction and/or abut(s) an abutment face which is orientated transversely relative to the assembly direction.

In order to achieve the object mentioned, according to a second aspect additional features relating to a housing are alternatively provided according to the invention. In particular, consequently, in a housing of the type described in the introduction, alternatively to the solution to the objective mentioned, it is provided that at least one housing shell be constructed without undercuts. This embodiment is possibly of independent inventive quality but can preferably be combined with the embodiments which are described above. In this solution, it is advantageous for a forming tool to be able to be produced for the at least one housing shell with relatively little complexity because in particular sliding members for producing undercuts can be dispensed with. There is preferably provision for both the lower shell and the upper shell to be constructed without undercuts.

The invention can achieve this, for example, in that the necessary undercuts for access openings are constructed at the seal. As a result of the preferably linear configuration of the sealing segments, these complex structures may be readily achievable in the associated forming tools by displacement of corresponding inserts.

There is preferably provision for the upper shell to be constructed without undercuts with respect to a mold removal direction which is predetermined by the viewing and/or activation window. In this case, it is advantageous for a forming tool to be able to be removed from the mold transversely relative to the two-dimensional extent of the upper shell so that short mold removal paths can be achieved.

Alternatively or additionally, there may be provision for the lower shell to be constructed without undercuts with respect to a mold removal direction which is predetermined by a rear-side base. In this case, it is advantageous for the mold removal direction for the lower shell to be achievable transversely to the rear-side base of the lower shell so that the mold removal direction can be configured to be transverse relative to a substantially two-dimensional extent of the lower shell, resulting in short mold removal paths.

In one embodiment of the invention, there may be provision for the sealing segments to be constructed with multiple components with a hard component and a soft component, respectively. In this case, it is advantageous for a dimensional stabilization of the seal to be able to be achieved by the hard component while a high degree of sealing can be achieved by the soft component. There is preferably provision for both the hard component and the soft component of the assembled sealing segments to form a peripheral ring.

In one embodiment of the invention, there may be provision for at least one sealing element to form an annular interface opening and/or activation opening. This interface opening and/or activation opening is preferably orientated transversely to an assembly direction of the housing shells and affords access to interface and/or activation elements which are typically constructed at an edge of an inserted electronic device between a front side and a rear side. In this solution, it is advantageous for the interface and/or activation opening which are also constructed in previously known housings typically on the shells to be displaced into the seal so that the undercuts which are necessary therefor do not have to be constructed in the housing shells. Preferably, at least one of the housing shells, in particular both of the housing shells, has/have a corresponding recess which receives the interface and/or activation opening preferably in an assembly direction.

In one embodiment of the invention, there may be provision for the respective hard components of sealing segments placed against each other to be constructed so as to overlap in the extent direction. In this manner, a completely closed peripheral ring can be formed from the hard component, whereby a high level of dimensional stability of the seal is produced.

In one embodiment of the invention, alternatively or additionally there may be provision for the soft components of sealing segments placed against each other to be constructed so as to abut each other in the extent direction of the seal. This allows a fluid-tight closure of a peripheral ring of soft components, wherein a receiving groove can be constructed in the housing shell for the seal with a constant groove width.

According to a third aspect of the invention, further features of the of the invention directed toward a housing can be provided in order to achieve the object mentioned. Consequently, according to a third aspect of the invention in a housing of the type described in the introduction it is provided according to the invention in order to achieve the object that the housing shells be held together with at least one clip-fitting clip. In this instance, it is advantageous that complex folding mechanisms which would make a complex construction of the associated forming tools necessary can be dispensed with for the housing shells. In particular, it is thereby readily possible for the housing shells to be able to be constructed without undercuts. The invention according to this third aspect can therefore preferably be combined with the already-described second aspect and/or with the already-described first aspect in order consequently to allow a particularly simple production of the housing.

In one embodiment of the invention, there may be provision for the clip to be constructed to be U-shaped or C-shaped. In this case, it is advantageous for clip-fitting to be able to be carried out particularly simply. The clip-fitting is known as a connection technique in the prior art and can, for example, be characterized in that the clip which is intended to be clip-fitted is resiliently deformed during the clip-fitting operation and subsequently adheres to the housing shells in a positive-locking and/or non-positive-locking manner.

In this case, it is particularly advantageous for the clip to have at least at one free end an engaging projection which projects inside the already-described U-shape and/or C-shape. This allows a reliable positive-locking retention. A particularly reliable retention can be achieved if the clip has at two free ends an engaging projection which projects inside the U-shape and/or C-shape.

In this case, there may be provision for a or a respective engaging groove corresponding to an engaging projection, in particular the already-mentioned engaging projection, to be constructed in at least one of the housing shells, in particular in both housing shells. This allows a defined engagement of the clips during clip-fitting.

In one embodiment of the invention, there may be provision for a functional structure which projects from the housing shells in a position for use to be constructed on the clip. In this case, it is advantageous for the clip to be able to further apply or take up as a result of the retention function thereof additional functions, in particular a carrying function by means of a carrying lug as a functional structure and/or a fixing function in a configuration of the functional structure as a fixing device for a rod-like instrument. It is particularly advantageous if the rod-like instrument is a measuring sensor which, for example, is connected to an electronic device which is received in the housing. In this case, it is advantageous for different clips to be able to be used with different functional fittings optionally for connecting the housing shells.

In one embodiment of the invention, there may be provision for at least two identical fixing locations for a clip to be constructed on at least one of the two housing shells, preferably on both housing shells, respectively. In this case, it is advantageous for the clip to be able to be fixed to either of the fixing locations. Consequently, it is readily possible to produce the already-mentioned functional fittings at different locations of the housing. Thus, two clips with different functional fittings can also be exchanged for each other.

In this instance, there may accordingly be provision for two clips to be present in order to hold together the housing shells which have functional fittings which differ from each other and which are constructed so as to correspond to each other on a clip-fit side which contacts the housing shells. Consequently, it is possible for the clips to fit at the same fixing location and consequently to be able to be exchanged for each other. Therefore, the user can decide himself the fixing location at which he would like to arrange different functional fittings. In particular, for example, it is possible to construct carrying lugs depending on use as a left-handed or right-handed arrangement on the housing shells. The fixing devices mentioned can also be displaced so as to be readily suitable for left-handed and right-handed people.

Accordingly, in a fourth aspect the invention makes provision for an assembly kit for a housing according to the invention, in particular as described above, and/or according to any one of the claims which are directed toward a housing, in which at least two clips are provided to hold together the housing shells which have mutually different functional units and which are constructed in a corresponding manner on a clip-fit side which contacts the housing shells. Optional replacement of clips of different functional units for each other and/or a displacement of the clips with different functional units between different fixing locations of a housing is/are consequently readily possible.

BRIEF DESCRIPTION OF THE DRAWINGS

The invention will now be described in greater detail with reference to the embodiments, but it is not limited to these embodiments. Additional embodiments will result by combining the features of individual and/or multiple protective claims with each other and/or with individual or multiple features of the embodiments.

In the drawings:

FIG. 2 is a front view of an additional housing according to the invention,

FIG. 3 is a rear view of the housing from FIG. 2,

FIG. 4 is a detailed cross-section of the housing according to FIG. 2 with a section through a clip.

DETAILED DESCRIPTION

Figure 1:
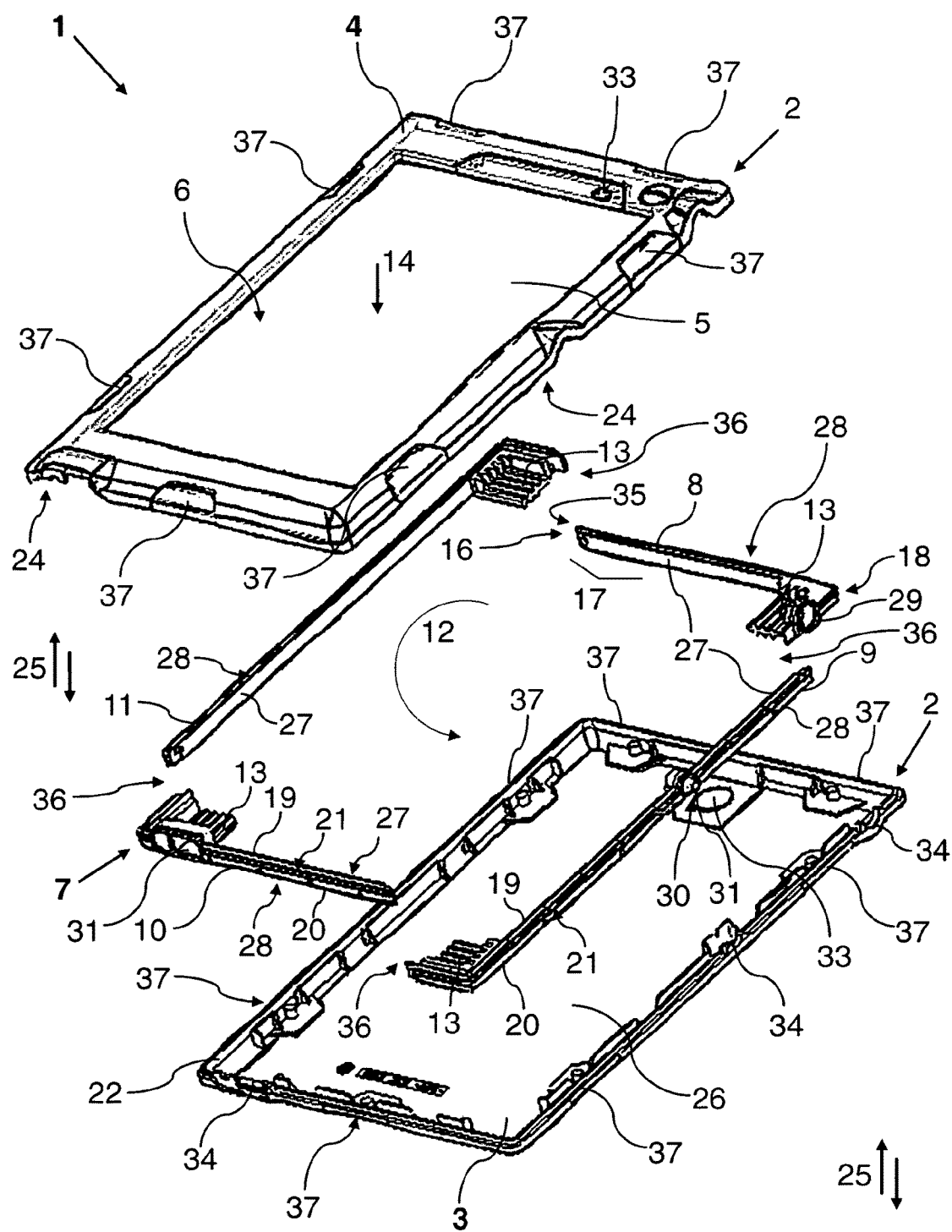
FIG. 1 is an exploded view of a housing according to the invention.

FIG. 1 shows a housing which is generally designated 1 for an electronic device which has two housing shells 2. In this case, one of the two housing shells 2 is constructed as a lower shell 3 and the other housing shell 2 is constructed as an upper shell 4.

In this case, the upper shell 4 has a display protection film 5 which outwardly closes a viewing and/or activation window 6.

A peripheral seal 7 which is composed of four sealing segments 8, 9, 10, 11 according to the invention is inserted between the upper shell 4 and the lower shell 3. The sealing segments 8, 9, 10, 11 are in this case placed one against the other in an extent direction 12 of the seal 7 in order to describe a rectangle. Each sealing segment 8, 9, 10, 11 forms an edge of the rectangle in this case.

There is constructed on each sealing segment 8, 9, 10, 11 a support mat 13 which fixes an inserted electronic device 15—for example, a tablet or a Smartphone—counter to an activation direction 14 which is predetermined by the viewing and/or activation window 7.

The support mats 13 of the sealing segments 8 and 10 and the support mats 13 of the sealing segments 9 and 11 are each constructed so as to correspond to each other.

At the free ends 16 thereof, the sealing segments 8, 9, 10, 11 each have a portion 17 with a constant cross-section.

The support mats 13 are each constructed at the opposite ends 18 of the sealing segments 8, 9, 10, 11 with respect to the free ends 16.

A sealing lip 19 and a sealing face 20 which are separated from each other by a groove 21 are constructed on each of the sealing segments 8, 9, 10, 11. Consequently, a peripheral sealing lip 19 and similarly peripheral sealing face 20 which are separated from each other by a peripheral groove 21 (in the extent direction 12) are constructed.

In this case, the sealing face 20 is pressed into the position for use against an abutment face 22 on the lower shell 3 radially, that is to say, transversely relative to an assembly direction 23 of the housing shells 2 and consequently seals the lower shell 3. The sealing lip 19 is pressed in the same manner against a radially orientated and peripheral abutment face 24 which is constructed on the upper shell 4. The sealing face 20 is wider than the sealing lip 19 and therefore adheres more powerfully to the lower shell 3 than the sealing lip 19 does to the upper shell 4. When the housing 1 is opened, the seal 7 therefore remains in the lower shell 3.

The housing shells 2 are formed without undercuts in such a manner that, with injection-molding production, they allow removal in a mold removal direction 25 which coincides with the assembly direction 13. The mold removal direction 25 of the lower shell 4 consequently coincides with a direction which is predetermined by a rear-side base 26 of the housing 1. However, the mold removal direction 25 of the upper shell 4 coincides with a direction which is predetermined by the viewing and/or activation window 6.

In this instance, the necessary undercuts for forming a functional housing 1 are displaced into the sealing segments 8, 9, 10, 11, as will be described in greater detail below.

The sealing elements 8, 9, 10, 11 are each comprised of a hard component 27 and a soft component 28. The hard component 27 and the soft component 28 are each constructed in an annularly peripheral manner.

In this case, the hard component 27 is constructed in a strip-like manner and supports the soft component 28 from the inner side.

In the seal 7, annular interface and/or activation openings 29, 30, 31 are constructed in the hard components 27 at different locations. This requires corresponding undercuts to form the annular form.

The interface and/or activation opening 29 is constructed, for example, for a jack plug and can be closed by a stopper which seals the hard component 27 at this location.

The interface and/or activation opening 30 carries an activation tappet 32 in order to activate buttons on an inserted electronic device 15 from the outer side.

The interface and/or activation opening 31 is constructed, for example, for a (micro) USB plug and can also be closed.

Viewing windows 33 for a camera of the electronic device 15 can be constructed in the lower shell 3 and/or in the upper shell 4.

The interface and/or activation openings 29, 30, 31 are inserted in corresponding openings 34 in the housing shells 2.

At the free ends 16 of the sealing segments 8, 9, 10, 11, the hard components 28 each open in a tongue 35 which overlaps with the hard component 28 of the adjacent sealing element 8, 9, 10, 11. However, the associated soft components 27 do not overlap but instead abut each other at the separation locations 36.

The lower shell 3 and the upper shell 4 are held together at fixing locations 37 by clips 38 which are not illustrated in greater detail here and which are explained in greater detail with respect to the remaining illustrations. The clips 38 are each clip-fitted to the housing shells 2 laterally or from the side.

FIGS. 2 to 4 show another housing 1 according to the invention. Components and functional units which are equivalent or identical structurally and/or functionally to the embodiment according to FIG. 1 are indicated with the same reference numerals and are not described separately. The explanations in relation to FIG. 1 apply to FIGS. 2 to 4 accordingly.

FIG. 4 is a cross-section of one of the clip-fitted clips 38. The U-shape or the C-shape of the clip 38 can be seen. An inwardly projecting engaging projection 40 is constructed at the free ends 39 and engages in a positive-locking manner in a corresponding engaging groove 41 in the respective housing shell 2.

The fixing locations 37 are constructed identically to each other. The internal clip-fit sides 46 of the clips 38 are also constructed identically so that all the clips 38 can be fixed to all the fixing locations 37.

Figure 5:
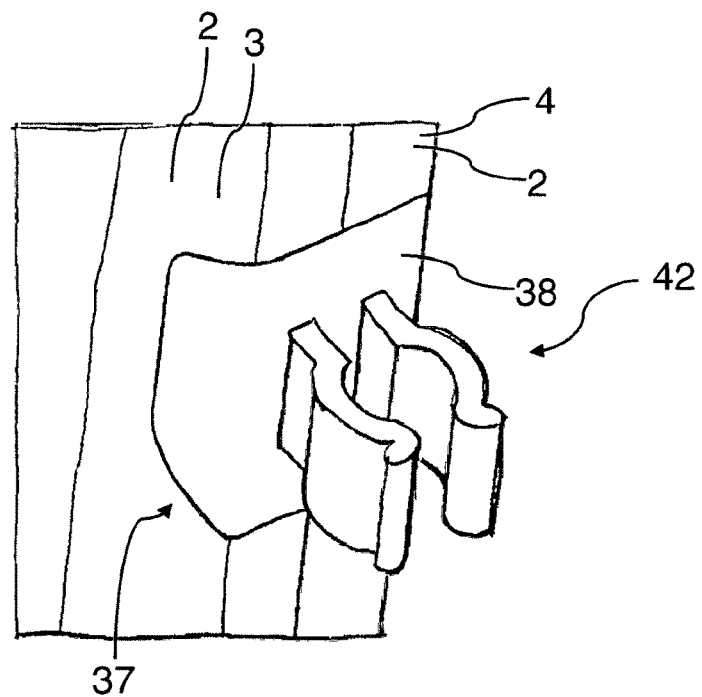
FIG. 5 is an individual view of a clip with a functional structure comprising a fixing device in a housing according to FIG. 2.
Figure 6:
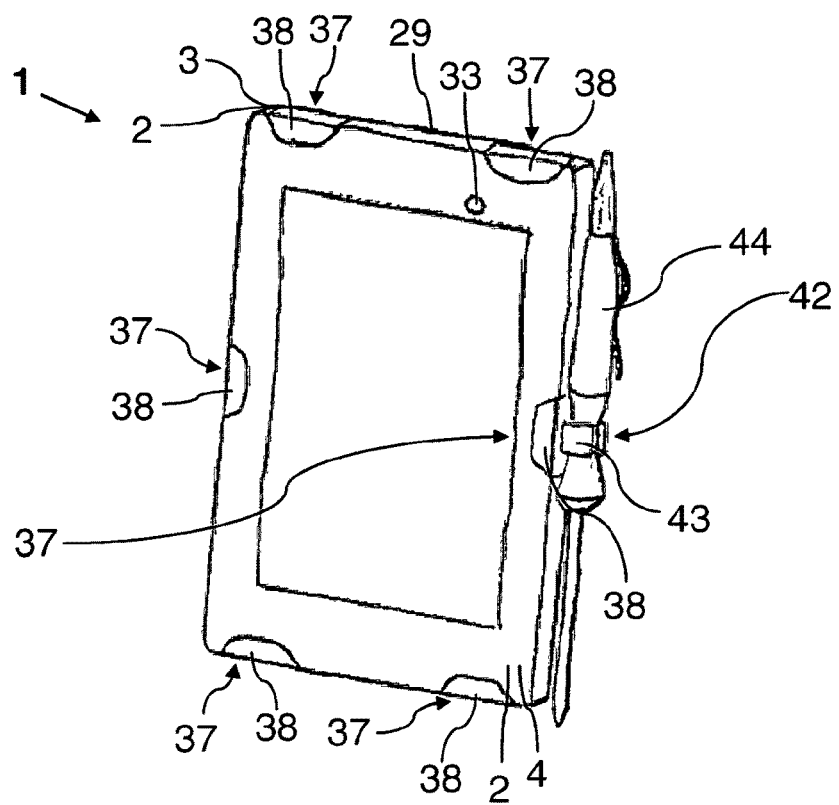
FIG. 6 shows a use according to the invention of the clip according to FIG. 5 in a housing according to the invention.

FIG. 5 and FIG. 6 show an additional embodiment of a housing 1 according to the invention. Components and functional units which are equivalent or identical structurally and/or functionally to the embodiment according to FIG. 1 or 2 to 4 are indicated with the same reference numerals and are not described separately. Therefore, the explanations in relation to FIGS. 1 to 4 apply to FIGS. 5 and 6 accordingly.

FIG. 5 shows a clip 40 with a functional structure 42 which is constructed here as a fixing device 43 for a rod-like instrument 44, for example, a measuring sensor or a pen. The clip 38 according to FIG. 5 can be clip-fitted to any fixing location 37 in FIG. 6. The position of the instrument 44 on the housing 1 is consequently variable.

Figure 7:
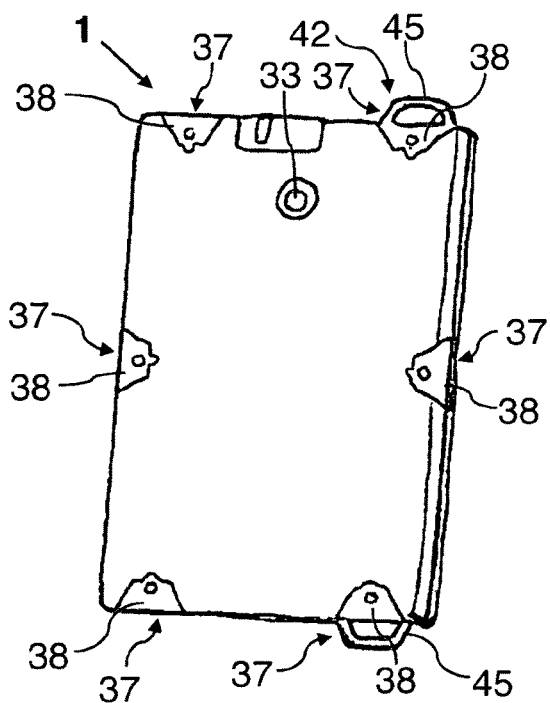
FIG. 7 shows another housing according to the invention with a first arrangement of clips with different functional fittings.
Figure 8:
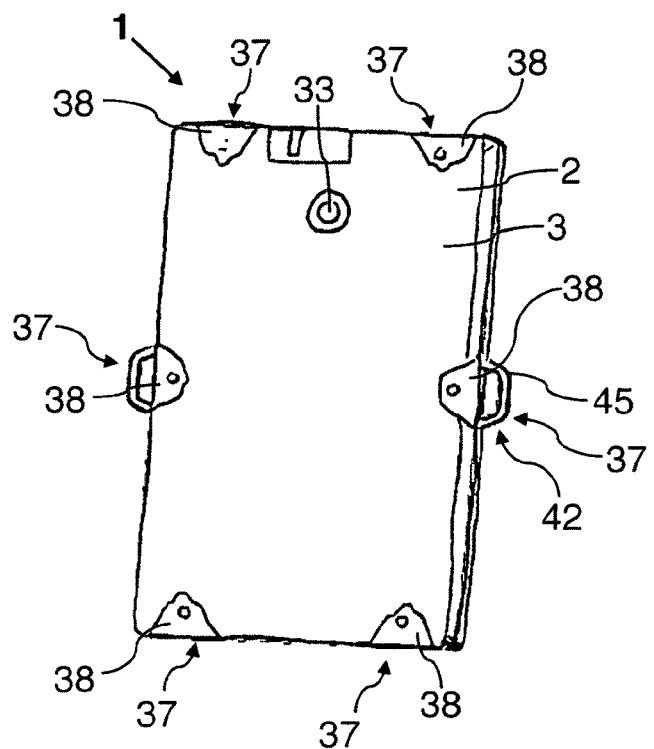
FIG. 8 shows the housing according to FIG. 7 with a second arrangement of the clips shown in FIG. 7.

FIG. 7 and FIG. 8 show another embodiment of a housing 1 according to the invention which may be constructed identically to FIGS. 5 and 6. Components and functional units which are equivalent or identical structurally and/or functionally to the embodiment according to FIGS. 1 to 6 are indicated with the same reference numerals and are not described separately. Therefore, the explanations in relation to FIGS. 1 to 6 apply to FIGS. 7 and 8 accordingly.

FIGS. 7 and 8 show that clips 38 can be provided with a functional structure 42 in the form of a carrying lug 45. As a result of the displaceability of the clips 38, the carrying lugs 45 can be arranged at any fixing locations 37.

Consequently, the housing 1, the clips 38 without any functional structure, the clips 38 with a fixing device 43 and the clips 38 with the carrying lug 45 form an assembly kit for a housing.

In a housing 1 for an electronic device 15, it is provided that a peripheral seal 7 is constructed between a lower shell 3 and an upper shell 4, which peripheral seal is formed from at least two mutually adjoining sealing segments 8, 9, 10, 11 and/or the lower shell 3 and the upper shell 4 be constructed without undercuts and/or be held together with clip-fitting displaceable clips 38.

LIST OF REFERENCE NUMERALS

1 Housing
2 Housing shell
3 Lower shell
4 Upper shell
5 Display protection film
6 Viewing and/or activation window
7 Seal
8 Sealing segment
9 Sealing segment
10 Sealing segment
11 Sealing segment
12 Extent direction
13 Support mat
14 Activation direction
15 Electronic device
16 End
17 Portion
18 Opposite end
19 Sealing lip
20 Sealing face
21 Groove
22 Abutment face
23 Assembly direction
24 Abutment face
25 Mold removal direction
26 Base
27 Hard component
28 Soft component
29 Interface and/or activation opening
30 Interface and/or activation opening
31 Interface and/or activation opening
32 Activation tappet
33 Viewing window
34 Recess
35 Tongue
36 Separation location
37 Fixing location
38 Clip
39 End
40 Engaging projection
41 Engaging groove
42 Functional structure
43 Fixing device
44 Instrument
45 Carrying lug
46 Clip-fit side

The invention claimed is:

1. A housing (1) for an electronic device (15), comprising first and second housing shells (2), the first housing shell (2) is constructed as a lower shell (3) and the second housing shell (2) is constructed as an upper shell (4) which is positionable on the lower shell (3), at least one of a viewing or activation window (6) which is closed with a display protection film (5) constructed in the upper shell (4), and a peripheral seal (7) that seals a connection between the housing shells (2) the peripheral seal (7) is comprised of at least two sealing segments (8, 9, 10, 11) which are separate from each other and which are placed against each other in an extent direction of the peripheral seal (7).

2. The housing (1) according to claim 1, wherein the peripheral seal (7) forms edges of a rectangle.

3. The housing (1) according to claim 2, wherein the sealing segments (8, 9, 10, 11) in a mutually abutting arrangement each form an edge of the rectangle.

4. The housing (1) according to claim 1, further comprising a support mat (13) constructed in at least one of the sealing segments (8, 9, 10, 11), the support mat (13) is adapted to fix an inserted electronic device (15) in an activation direction (14) predetermined by the at least one of the viewing or activation window (6).

5. The housing (1) according to claim 4, wherein there are a plurality of the support mats (13) which correspond are constructed at least on two of the sealing segments (8, 9, 10, 11).

6. The housing (1) according to claim 5, wherein the at least two sealing segments (7) each have a portion (17) having a constant cross-section at an end (16), and the support mats (13) are constructed at an opposite end of each said sealing segment (8, 9, 10, 11).

7. The housing (1) according to claim 1, wherein the seal (7) has a peripheral sealing lip (7) and a peripheral sealing face (7).

8. The housing (1) according to claim 7, wherein the sealing lip (19) and the sealing face (20) are separated from each other by a peripheral groove (21).

9. The housing according to claim 1, wherein
at least one of the upper or the lower housing shells (2) is constructed without undercuts.

10. The housing (1) according to claim 1, wherein the sealing segments (8, 9, 10, 11) are constructed with multiple components including a hard component (27) and a soft component (28).

11. The housing (1) according to claim 10, wherein at least one of the sealing segments (8, 9, 10, 11) forms with the hard component (27) thereof, at least one of an annular interface opening or activation opening (29, 30, 31).

12. The housing (1) according to claim 10, wherein the hard components (27) of sealing segments (8, 9, 10, 11) placed against each other are constructed so as to overlap in the extent direction (12) or the soft components (28) of sealing segments (8, 9, 10, 11) placed against each other are constructed so as to abut each other in the extent direction (12), or both.

13. The housing according to claim 1, further comprising
at least one clip (38) that holds the housing shells (2) together.

14. The housing (1) according to claim 1, wherein the seal (7) seals at least one of transversely relative to an assembly direction (23) of the housing shells (2) or abuts an abutment face (22) of at least one housing shell (2) which is orientated transversely relative to the or an assembly direction (23).

* * * * *